United States Patent
Badillo

(10) Patent No.: US 9,751,468 B1
(45) Date of Patent: Sep. 5, 2017

(54) VEHICLE RACK BRACKET

(71) Applicant: Intelligent Designs 2000 Corp., Aurora, CO (US)

(72) Inventor: Paul Badillo, Littleton, CO (US)

(73) Assignee: Intelligent Designs 2000 Corp., Aurora, CO (US)

( * ) Notice: Subject to any disclaimer, the term of this patent is extended or adjusted under 35 U.S.C. 154(b) by 72 days.

(21) Appl. No.: 14/978,957

(22) Filed: Dec. 22, 2015

Related U.S. Application Data

(60) Provisional application No. 62/190,542, filed on Jul. 9, 2015.

(51) Int. Cl.
*B60R 9/048* (2006.01)

(52) U.S. Cl.
CPC ................................. *B60R 9/048* (2013.01)

(58) Field of Classification Search
CPC .................. B60R 9/00; B60R 9/048
USPC ............... 224/545, 558, 560, 567, 570, 319; 248/227.1; D12/223
See application file for complete search history.

(56) References Cited

U.S. PATENT DOCUMENTS

| | | | | | |
|---|---|---|---|---|---|
| 5,037,019 | A | * | 8/1991 | Sokn | B60R 9/00 224/403 |
| 5,957,352 | A | * | 9/1999 | Gares | B25H 3/04 224/401 |
| 5,996,736 | A | * | 12/1999 | Stankiewicz | B60R 9/0485 182/127 |
| 7,111,764 | B2 | * | 9/2006 | Smith | B60R 9/0485 182/127 |
| D702,620 | S | * | 4/2014 | Read | D12/223 |
| 9,199,582 | B2 | * | 12/2015 | Hill | B60R 9/00 |
| D769,174 | S | * | 10/2016 | Badillo | D12/223 |
| D773,372 | S | * | 12/2016 | Badillo | D12/223 |
| 2005/0082326 | A1 | * | 4/2005 | Badillo | B62D 43/02 224/326 |
| 2005/0098595 | A1 | * | 5/2005 | Smith | B60R 9/0485 224/319 |

OTHER PUBLICATIONS

U.S. Appl. No. 29/535,959, filed Aug. 12, 2015, Badillo.
U.S. Appl. No. 29/536,911, filed Aug. 20, 2015, Badillo.
"Hi-Lift mount for 6" tall racks, Axe & Shovel mount for 6" and 5" tall rack, Hi-Lift jack mount for 5" tall racks," BajaRacks Adventure Equipment, 5 pages, first sales 2011 [retrieved from: http://www.bajarack.com/accesories-page].
"Hi-Lift Mount for 3" Height Racks," BajaRacks Adventure Equipment, 2 pages, first sale 2014 [retrieved from: http://www.bajarack.com/accesories-page].
"Hi-Lift mount for FJ Cruiser factory rack." BajaRacks Adventure Equipment, 2 pages, first sale 2014 [retrieved from: http://www.bajarack.com/accesories-page].
"Axe & Shovel Mount for FJ Cruiser rack," BajaRacks Adventure Equipment, 2 pages, first sale 2014 [retrieved from: http://www.bajarack.com/accesories-page].

* cited by examiner

*Primary Examiner* — Justin Larson
(74) *Attorney, Agent, or Firm* — Sheridan Ross PC

(57) ABSTRACT

A bracket system is provided that is adapted to be interconnected to a vehicle roof rack. The bracket system may include a plurality of supports for receipt of one or more tools, such as shovels, axes, or high lift jacks. The bracket system is selectively interconnected to a portion of the vehicle rack and includes a retainer plate that secures the maintains a position of the tools on various support provided by the bracket.

10 Claims, 9 Drawing Sheets

VEHICLE RACK BRACKET

This application claims the benefit of U.S. Provisional Application Ser. No. 62/190,542, filed Jul. 9, 2015, the entire disclosure of which is incorporated by reference herein.

FIELD OF THE INVENTION

Embodiments of the present invention are generally related to brackets adapted for interconnection to a vehicle roof rack. The brackets are also adapted to secure tools or other items.

BACKGROUND OF THE INVENTION

Racks interconnected to the vehicle's roof or hood provide additional storage space on motor vehicles. The storage space racks provide allow the area inside the vehicle to be used for additional in-vehicle storage or passenger seating. Many owners take their vehicles off-road and wish to bring tools and other items they may need on their journey, such as shovels, axes, vehicle jacks, tents, awnings, etc. However, it may not be possible or feasible to store these items inside the vehicle due to interior space limitations. Moreover, the owner may not want to store soiled tools in their vehicle, and must store these items on the vehicle exterior. One particular storage location is the roof rack, but tool storage on the roof rack is not ideal due to space limitations. To address this issue, brackets adapted to secure tools and other items often used in off-road excursions to the roof rack may be provided.

U.S. Published Patent Application No. 2005/0082326 ("the '326 application"), which is incorporated by reference herein, shows an example of a roof rack bracket. More specifically, FIGS. 1-3 show a bracket 2 disclosed in the '326 application that is adapted to interconnect with a vehicle rack 4. The bracket 2 includes an upper portion 6 having a hook 10 that engages an upper rack portion 14, i.e., an upper tubular member of the vehicle rack. The upper portion 6 is also interconnected to a lower portion 18 that is interconnected to a lower rack portion 22, i.e., a lower tubular member. The lower clamp portion 22 also includes a hook 26 for engagement to the lower rack portion 22. The upper portion 6 and the lower portion 18 are interconnected by way of a plurality of bolts 30 secured with nuts 34. The upper portion 6 includes an upper support 38 for securing an item, such as the axe 44, and a lower support portion 48 for securing an item, such as a shovel 52. The tools stored on the upper and lower supports are maintained by a retention plate 56 that interfaces with a surface of the tool. The retention plate 56 is received on a threaded shank 58 associated with the upper portion 6. The retention plate 56 is held in place by a knob 60 threateningly engaged onto the threaded shank 58. The retention plate 56 is biased by a spring 68 so the retention plate 56 is normally positioned away from the upper portion 6.

The bracket 2 has a variety of drawbacks. For example, if the space between the upper rack portion 14 and the lower rack portion 22 is minimal, which is common in many low-profile vehicle racks, it is difficult to access and engage the bolts 30 necessary to secure the top portion 6 to the lower portion 18. In addition, if a user can attach both bracket portions, it is difficult to remove or move the attached bracket because of this access issue.

SUMMARY OF THE INVENTION

It is one aspect of some embodiments of the present invention to provide a bracket for interconnection to a vehicle rack. The bracket can be interconnected to any side of the vehicle rack—left, right, front, or back. The bracket of one embodiment of the present invention includes an upper portion with a hook for engagement to an upper roof rack portion, i.e., the vehicle rack's upper tubular member. The upper bracket portion includes at least one support that receives and secures tools. A tool is secured to a support with a retainer plate held in place with a knob received on a threaded shank associated with the upper bracket portion. The upper bracket portion is held in place by a clamp plate that also interfaces with a lower roof rack portion. The clamp plate is selectively interconnected to the upper portion of the bracket system by way of a bolt secured with a nut.

It is another aspect of some embodiments of the present invention to provide a bracket that is easy to interconnect to the vehicle rack. More specifically, counter the bracket of the prior art, the bolt/nut combination that interconnects the clamp plate to the upper bracket portion, is enhanced. Accordingly, a user can easily engage the nut with the ranch and tighten the bolt head. The bracket may employ a nut plate or other means to interface with the bolt, wherein the nut may not be required, which would further enhance interconnection of the clamp plate to the bracket portion.

As briefly mentioned above, a tool is secured to a bracket support with a retainer plate. The retainer plate has an aperture that receives a threaded shank that extends from an outer surface of the upper bracket portion. The threaded shank also operatively receives a knob. In operation, tightening the knob moves the retainer plate towards the bracket and the stored tool is firmly seated between the retainer plate and the support. The retainer plate may be spring biased such that when the knob is loosened; the retainer plate is moved away from the support, which will allow the retainer plate to rotate about the threaded shank to allow for the supports to receive the tools. This functionality also facilitates removal of the tools from the bracket.

It is yet another aspect of embodiments of the present invention to provide a bracket with security features. For example, the knob used to secure the retainer plate to the bracket may include a lock. In operation, the knob can be locked in place such that movement of the retainer plate away from the upper bracket is prevented and access to the stored tools is prevented. The retainer plate or supports may also include tabs or other features that interface with corresponding surfaces on the support or retainer plate to prevent retainer plate rotation. For example, the retainer plate may have a surface profile that engages the side of the supports when the retainer plate is near or in contact with the supports. The contacting portions of the retainer plate and the supports prevent retainer plate rotation unless the knob and retainer plate are positioned away from the upper bracket portion. As mentioned above, some embodiments of the present invention employ a nut plate that receives a bolt instead of a nut. In this embodiment of the present invention, side portions of the bracket can be closed off so the nut plate is hidden. Further, a lockable bolt may be provided such that once the clamp plate is interconnected to the bracket, it cannot let be removed without unlocking the bolt, which prevents removal of the bracket from the rack.

These and other advantages will be apparent from the disclosure of the invention(s) contained herein. The above-described embodiments, objectives, and configurations are neither complete nor exhaustive. As will be appreciated, other embodiments of the invention are possible using, alone or in combination, one or more of the features set forth above or described below. The Summary of the Invention is neither intended nor should it be construed as being representative of the full extent and scope of the present invention. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description of the Invention and no limitation as to the scope of the present invention is intended by either the inclusion or non-inclusion of elements, components, etc. in this Summary of the Invention Additional aspects of the present invention will become more readily apparent from the Detail Description, particularly when taken together with the drawings.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain explain the principles of these inventions.

Figure 1:
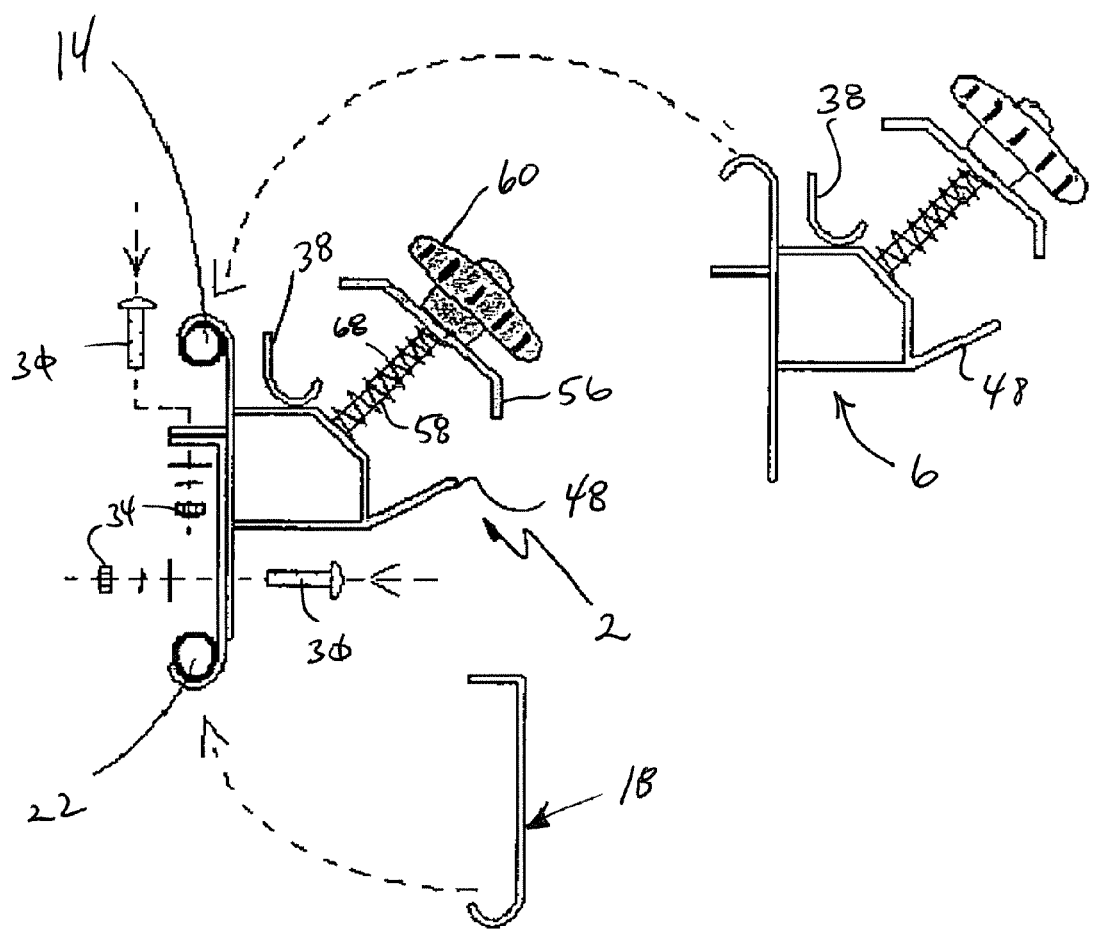
FIG. 1 is an exploded side elevation view of a prior art bracket.
Figure 2:
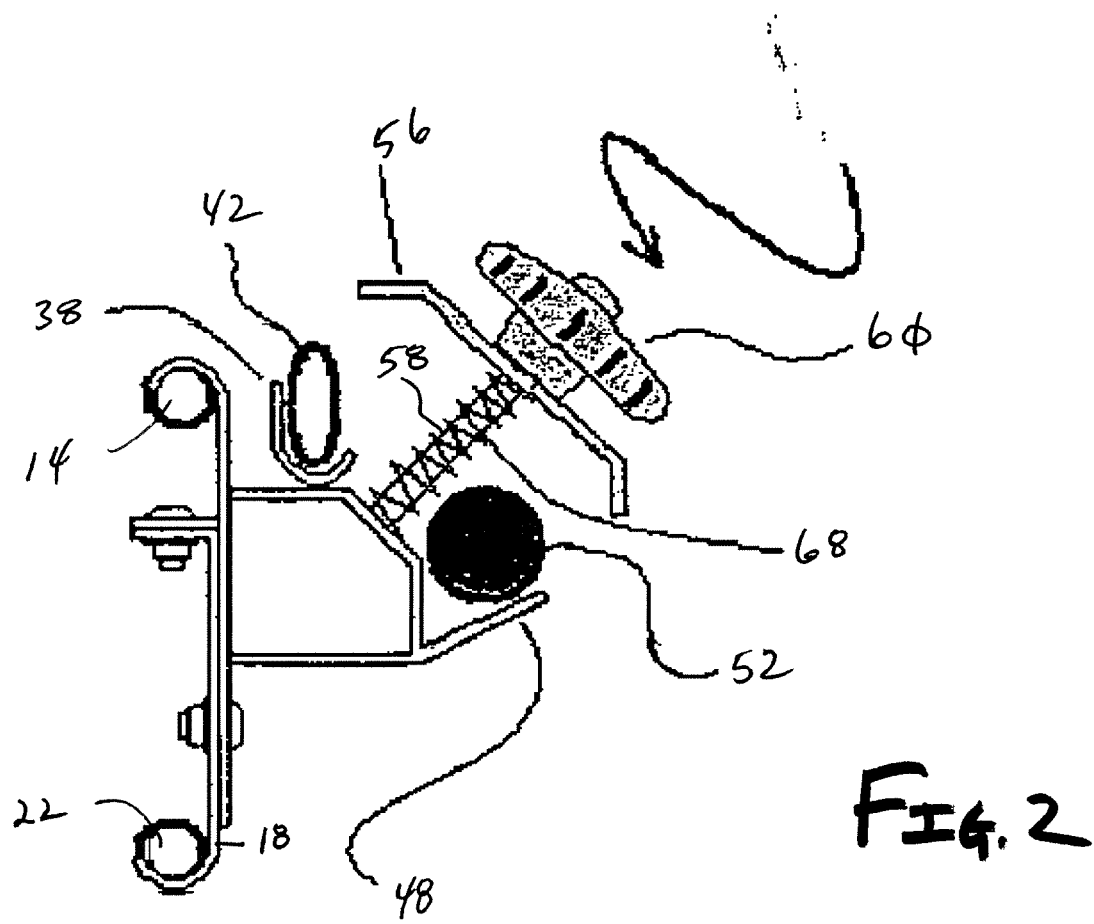
FIG. 2 is a side elevation view similar to FIG. 1, wherein tools are positioned on bracket supports.
Figure 3:
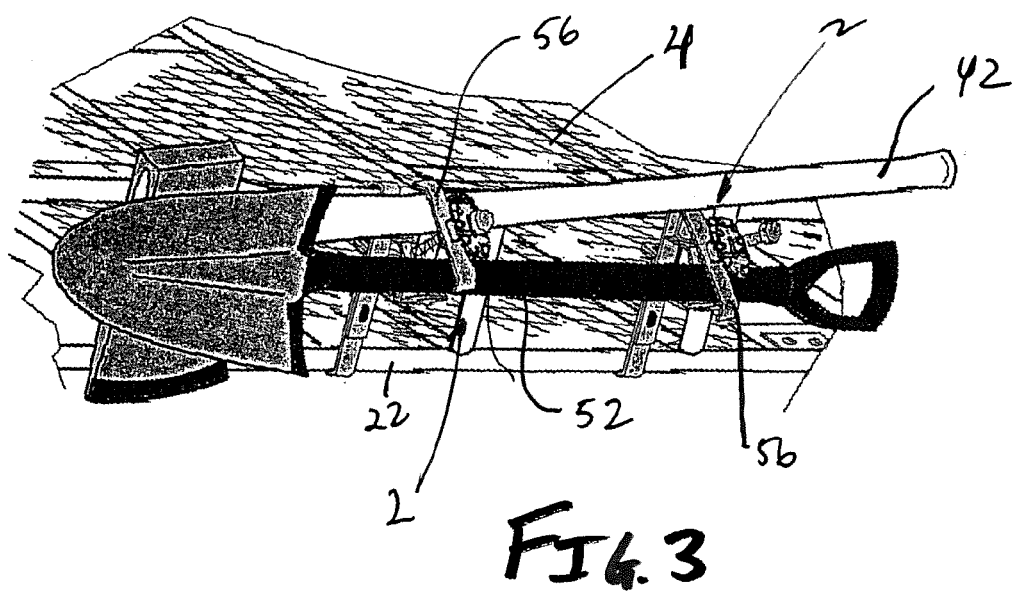
FIG. 3 is a perspective view showing tools interconnected to a vehicle rack by way of the prior art bracket.
Figure 4:
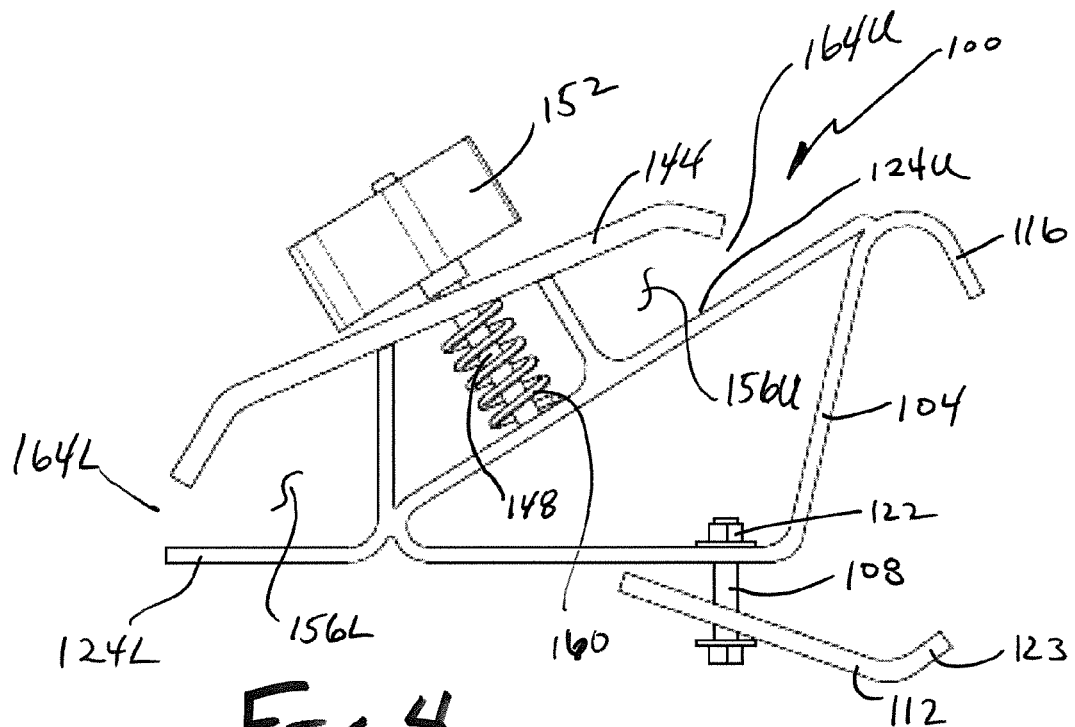
FIG. 4 is a front elevation view of a bracket system of one embodiment of the present invention.
Figure 5:
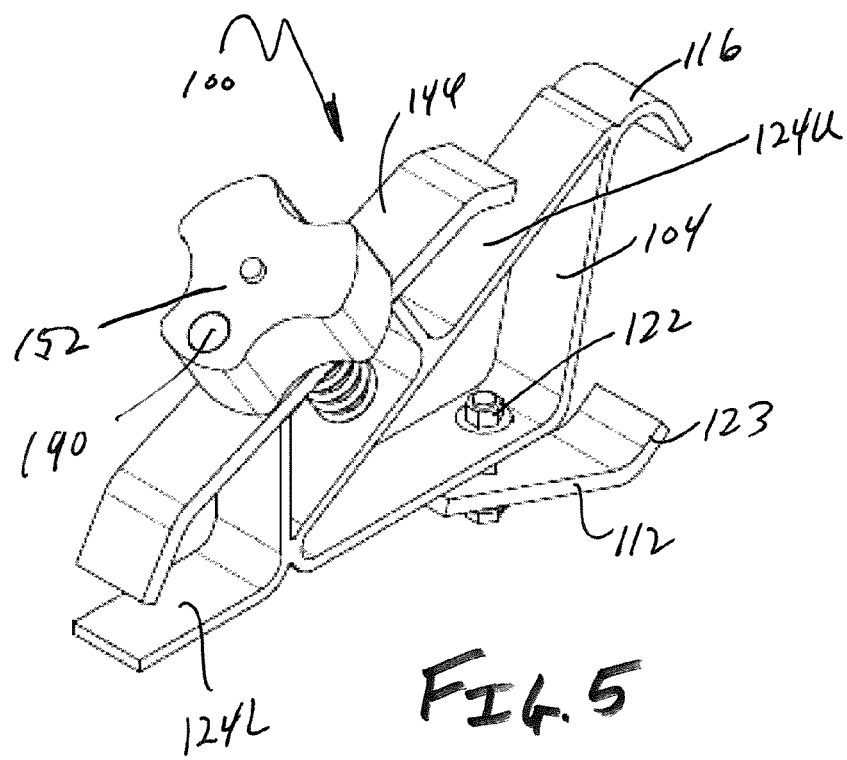
FIG. 5 is a top perspective view of FIG. 4.
Figure 6:
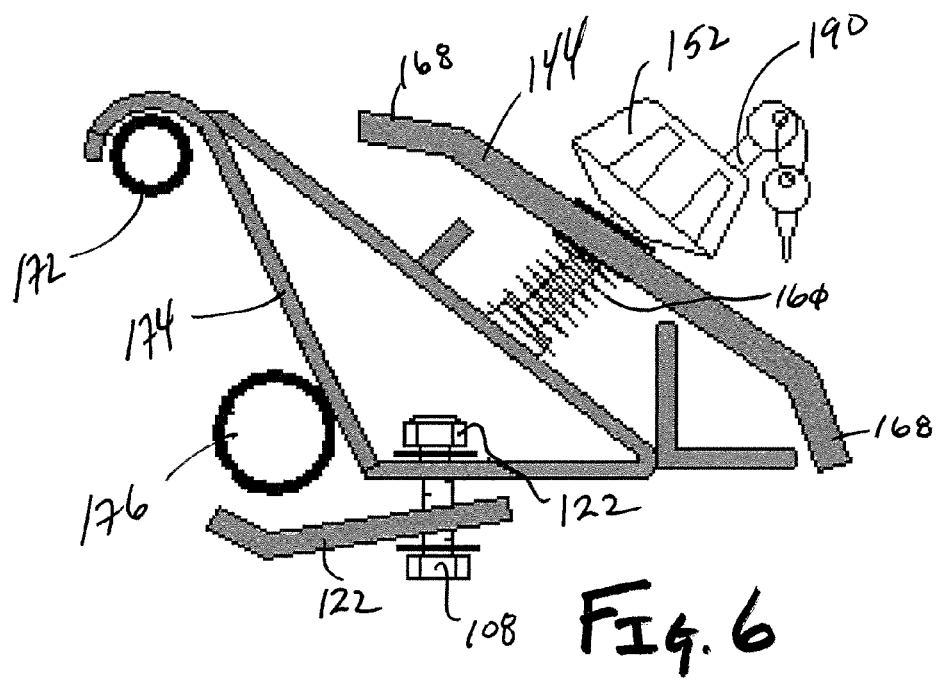
FIG. 6 is a side elevation view of the bracket system of one embodiment of the present invention interconnected to a vehicle rack.
Figure 7:
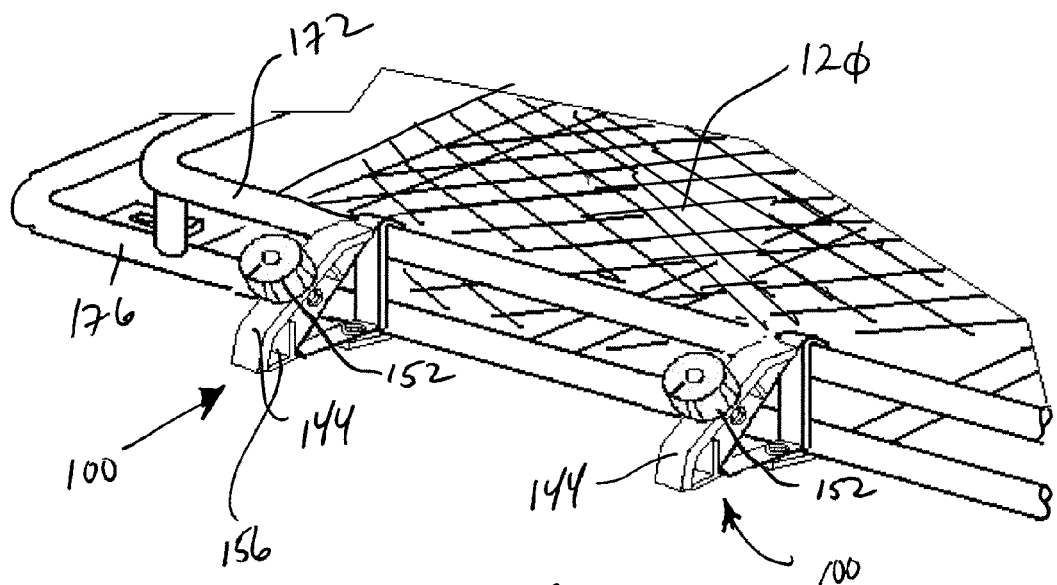
FIG. 7 is a perspective view of the bracket system of one embodiment of the present invention interconnected to a vehicle rack.
Figure 8:
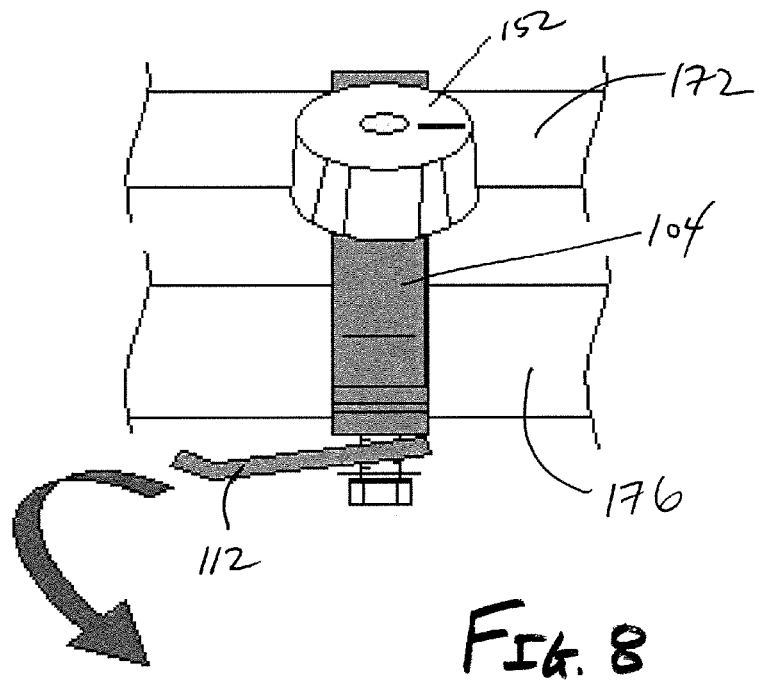
FIG. 8 is a side elevation view of the bracket system of one embodiment of the present invention interconnected to a vehicle rack.

To assist in the understanding of one embodiment of the present invention the following list of components and associated numbering found in the drawings is provided herein:

| # | Component |
|---|---|
| 2 | Bracket |
| 4 | Vehicle rack |
| 6 | Upper portion |
| 10 | Hook |
| 14 | Upper rack portion |
| 18 | Lower portion |
| 22 | Lower rack portion |
| 26 | Hook |
| 30 | Bolt |
| 34 | Nut |
| 38 | Upper support |
| 42 | Axe |
| 48 | Lower support |
| 52 | Shovel |
| 56 | Retention Plate |
| 58 | Threaded shank |
| 60 | Knob |
| 68 | Spring |
| 100 | Bracket system |
| 104 | Upper bracket portion |
| 108 | Bolt |
| 112 | Clamp plate |
| 116 | Hook |
| 120 | Vehicle rack |
| 122 | Nut |
| 123 | Lip |
| 124 | Support |
| 132 | Shovel |
| 136 | Axe |
| 140 | High lift Jack |
| 144 | Retainer plate |
| 148 | Threaded shank |
| 152 | Knob |
| 156 | Storage envelope |
| 160 | Spring |
| 164 | Opening |
| 168 | End |
| 172 | Upper vehicle rack structure |
| 176 | Lower vehicle rack structure |
| 180 | Vertical segment |
| 184 | Horizontal segment |
| 186 | Outer vertical segment |
| 190 | Locking member |

It should be understood the drawings are not necessarily to scale. In certain instances, details that are unnecessary for an understanding of the invention or that render other details difficult to perceive may have been omitted. It should be understood, of course, that the invention is not limited to the particular embodiments illustrated herein.

DETAILED DESCRIPTION

FIGS. 4-9 show a bracket system 100 of one embodiment of the present invention. The bracket system 100 includes an upper bracket portion 104 selectively interconnected by way of a bolt 108 to a clamp plate 112. The upper bracket portion 104 includes a hook 116 that works with the clamp plate 112 to secure the bracket system 100 to a vehicle rack 120 when a nut 122 is tightened onto the bolt 108 and the clamp plate 112. The clamp plate 112 may have an upwardly-extending lip 123 that enhances interconnection to the vehicle rack. The lip 124 may be hook shaped or comprise an angled portion of the clamp plate 112.

The upper bracket portion 104 includes at least one support 124 for the receipt of a tool, such as a shovel 132, an axe 136, or high lift jack 140. In the embodiment shown, an upper support 124U and a lower support 124L are provided. A retainer plate 144 ensures that the tools resting on the supports 124 remain secured to the upper bracket portion 104. The retainer plate 144 includes an aperture or slot (not shown) that receives a threaded shank 148 that extends from the upper bracket portion 104. The threaded shank 148 also threadingly receives a knob 152. Tightening the knob 152 onto the threaded shank 148 prevents the retainer plate 144 from moving away from the supports 124, thereby defining a storage envelope 156. The retainer plate 144 may employ curled or angled ends 168 to help maintain tools in the storage envelope 156 provided by the bracket system 100.

The retainer plate 144 of one embodiment of the present invention is biased away from the upper bracket portion 104 by the spring 160. When the knob 152 is loosened, the retainer plate 144 will move away from the upper bracket portion 104 and associated supports 124. This functionality allows an opening 164 to be maximized, which allows for easy removal of the tools. When open, the retainer plate 144 can rotate such that the ends 168 move away from the supports 124 and the user can quickly and easily remove the stored tools from the upper bracket portion 104. This functionality also allows the tools to be efficiently stored.

FIG. 6-9 show the bracket system 100 of one embodiment interconnected to the vehicle rack 120. Here, the hook 116 of the upper bracket portion 104 is engaged on an upper tubular member 172 of the vehicle rack 120. One of ordinary skill the art will appreciate that the upper bracket portion 104 need not comprise a hook, and may be of any shape to accommodate the shape of upper roof rack tubing. After the hook 26 is placed on the upper roof rack 172, a vertical or sloped wall 174 of the upper bracket portion 104 will rests against the lower roof rack structure 176. The clamp plate 112 can then be rotated into place under the lower vehicle rack structure 176 (See FIG. 8). Thereafter, the bolt 108 is tightened and the clamp plate 112 moves into close proximity or engagement with the lower vehicle rack structure 176. Moving the clamp plate 112 towards the upper bracket portion 104 will maintain the vehicle rack structures between the clamp plate 112 and the upper bracket portion 104. The force associated with engagement of the clamp plate 112 to the lower roof rack structure 176 will be reacted by engagement of the hook 116 onto the upper vehicle rack structure.

Figure 9:
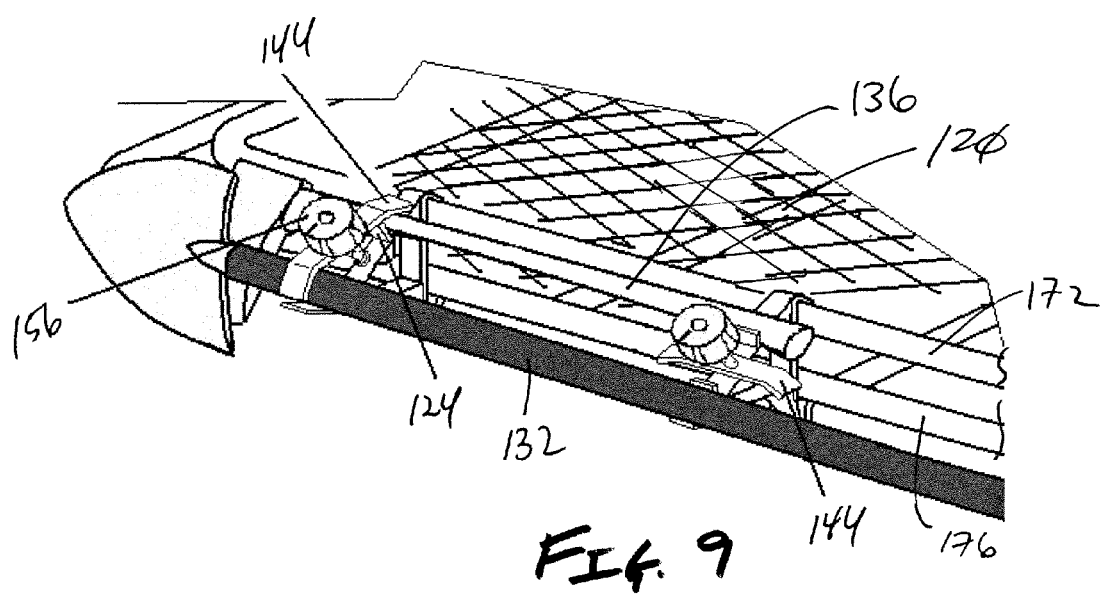
FIG. 9 is a perspective view showing the bracket system of one embodiment of the present invention interconnected to a vehicle rack and supporting a plurality of tools.

As particularly shown in FIG. 9, after the upper bracket portion 104 is installed, the retainer plate 144 is rotated to expose the upper and lower supports 124 which can then receive one or more tools. After the tools are in place, the retainer plate 144 is rotated over the tools, which closes the storage envelopes 156 (FIG. 7) that maintain the tools. The knob 152 is then turned and tightened on the threaded shank 148, which moves the retainer plate 144 in close proximity to the supports 124. Engagement of the retainer plate 144 to portions of the upper bracket portion of the tool will firmly secure the tool to the bracket system 100. The knob 152 may be locked in place such that rotation in an opposite direction is not possible. Again, some embodiments of the present invention include a biasing member that positions the retaining plate 144 away from the upper bracket portion 104 when the knob 152 is loosened, i.e., positioned away from the upper bracket portion 104.

Figure 10:
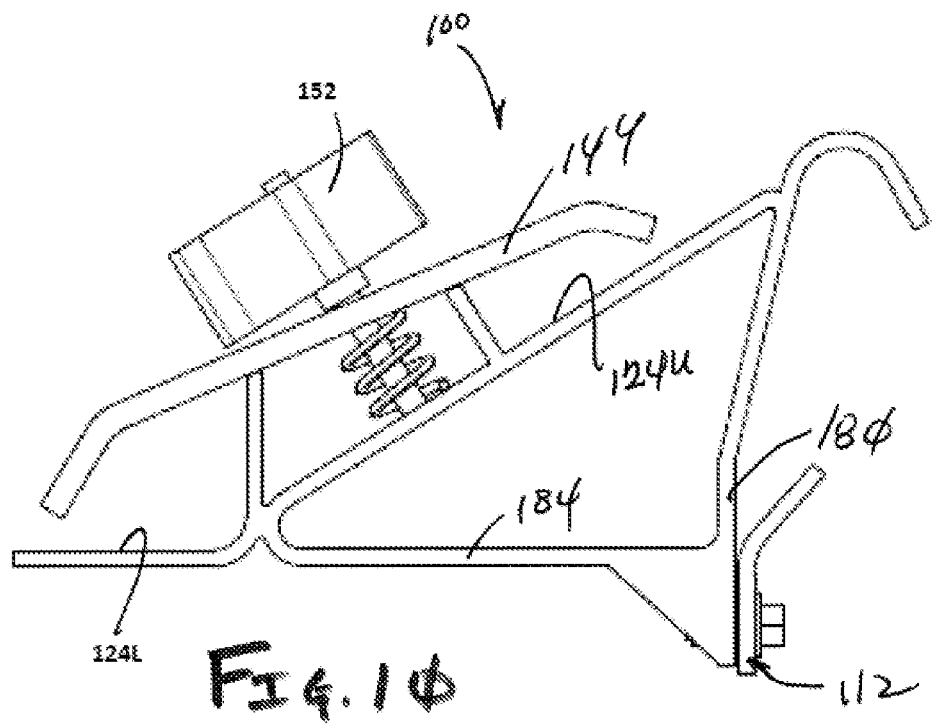
FIG. 10 is a front elevation view of a bracket system of another embodiment of the present invention.
Figure 11:
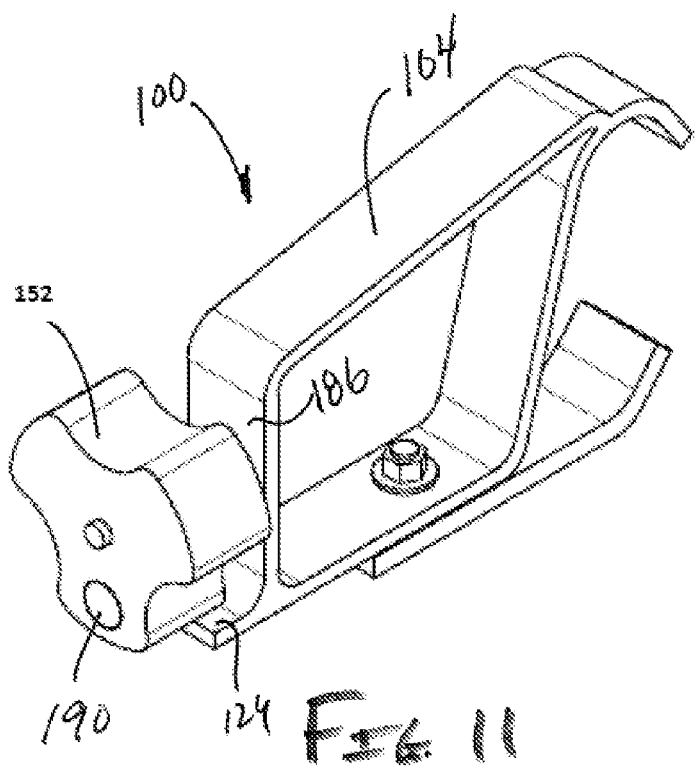
FIG. 11 is a perspective view of a bracket system of another embodiment of the present invention.
Figure 12:
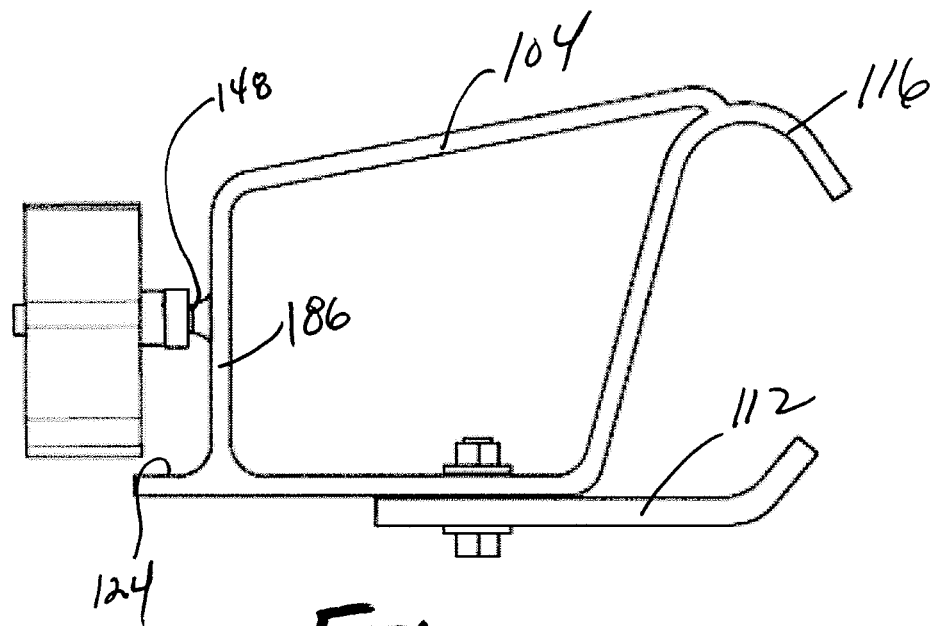
FIG. 12 is a front elevation view of the bracket system shown in FIG. 11.
Figure 13:
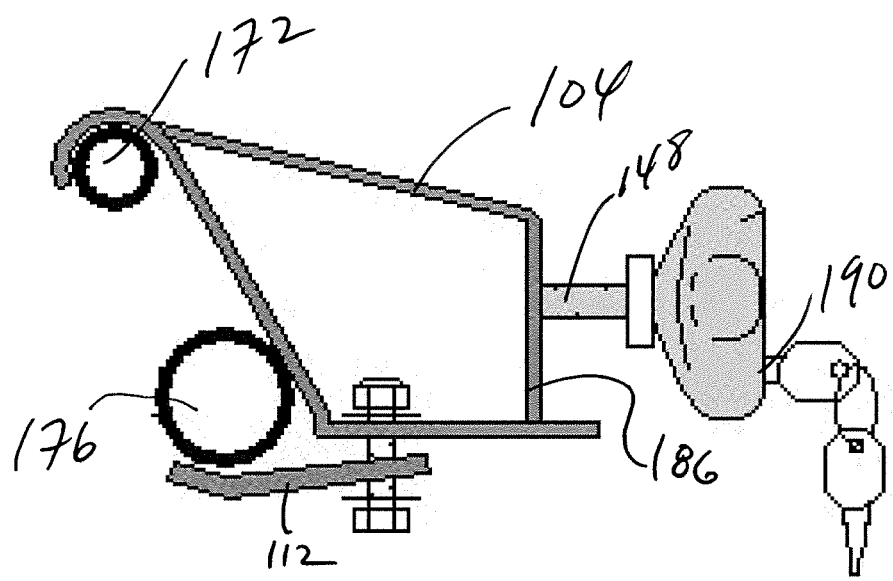
FIG. 13 is a side elevation view of the bracket system shown in FIG. 11 interconnected to the vehicle rack.
Figure 14:
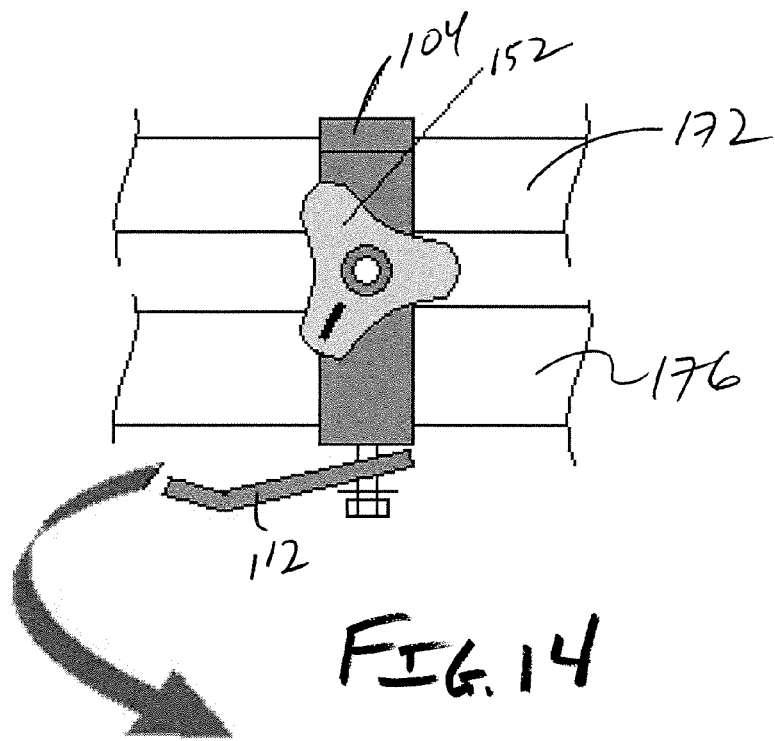
FIG. 14 is a side elevation view of the bracket system of FIG. 11 interconnected to the vehicle rack.
Figure 15:
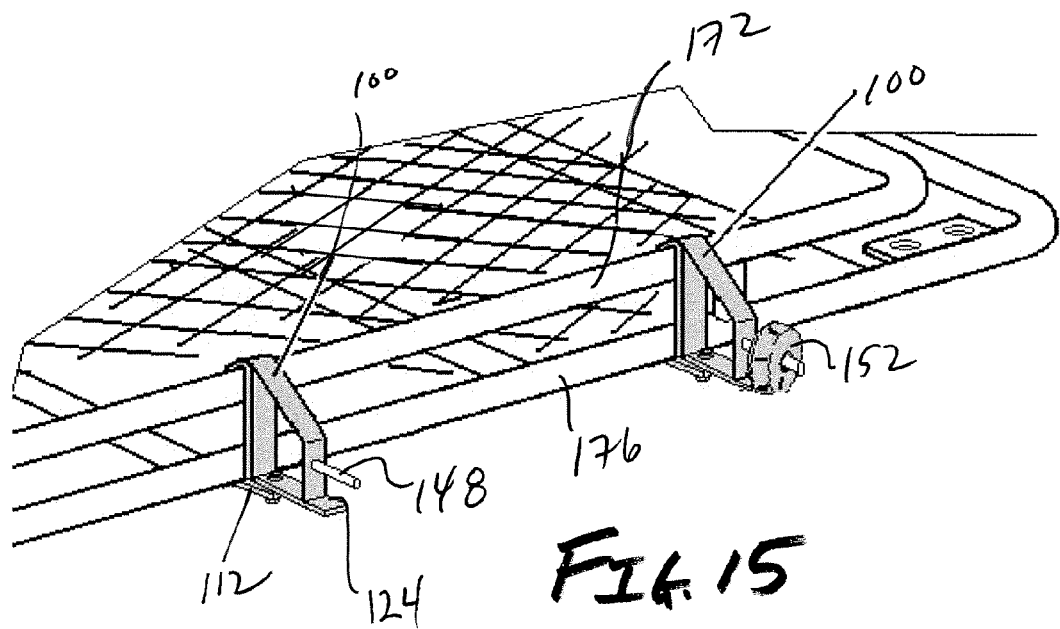
FIG. 15 is a perspective view showing the brackets of FIG. 11 interconnected to the vehicle rack.
Figure 16:
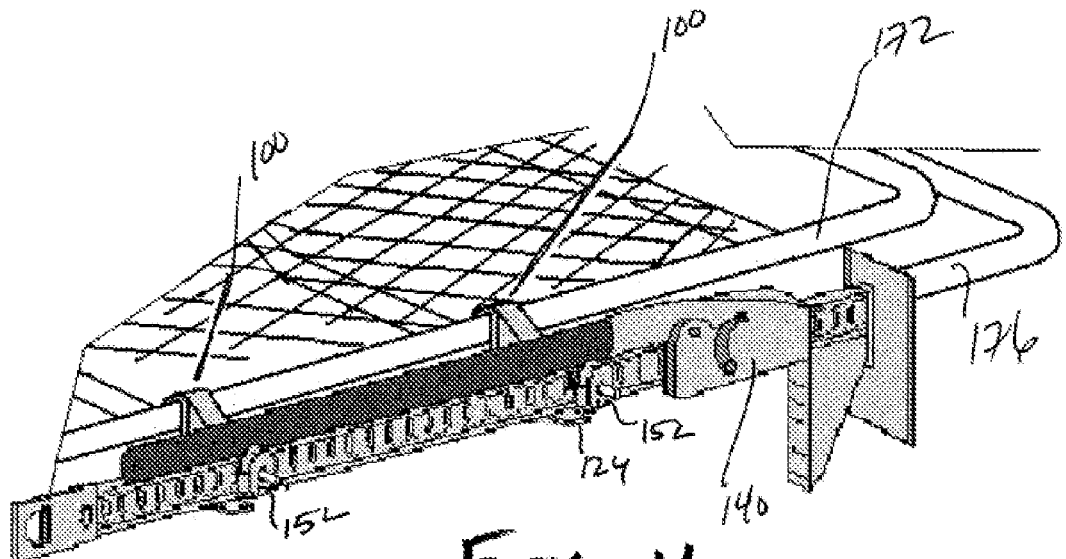
FIG. 16 is a perspective view showing a high lift jack interconnected to the brackets shown in FIG. 11.

FIG. 10 shows an alternative embodiment of the present invention, wherein the clamp plate 112 is interconnected to a vertical segment 180 of the upper bracket portion 104. Further, some embodiments of the present invention include an angled vertical portion 180. Here, the nut and bolt 108 are positioned horizontally along a horizontal segment 184 of the bracket. the clamp plate 112 is, generally vertical when installed such that at least an inner portion of the vehicle rack's lower support structure is engaged. The tool supports 124, retaining plate 144, and knob 152 of this embodiment of the present invention are substantially the same as those described above.

FIGS. 11-18 show another embodiment of the present invention that is somewhat rectangular. This embodiment of the present invention includes a small support 124 for receipt of a high lift jack. In operation, the knob 152 is moved along the threaded shank 148 that extends from an outer vertical segment 186 of the upper bracket portion 104. The bracket system 100 also includes a hook 116 and a clamp plate 112 as described above regarding the embodiment shown in FIGS. 1-6. In operation, the knob 152 is removed, thereby exposing the threaded shank 148. The high lift jack 140 is then placed on the support 124, wherein the threaded shank 148 is placed through a portion of the high lift jack 140, which leaves a portion of the threaded shank 148 exposed to receive the knob 152. The knob 152 is then tightened which sandwiches the high lift jack between the knob 152 and the outer vertical segment 186 of the upper bracket portion 104.

Figure 17:
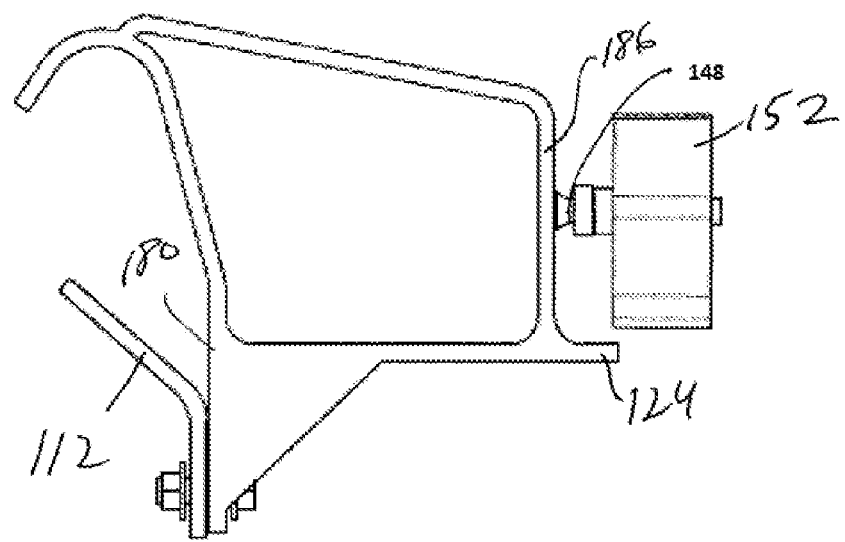
FIG. 17 is a front elevation view of another embodiment of a bracket system.

FIG. 17 shows yet another embodiment of the present invention adapted to store a high lift jack. This embodiment of the present invention is shaped similar and, thus, functions much like the bracket system shown in FIGS. 11-16. But the clamp plate 112 configuration closely follows that shown in FIG. 10. In operation, the knob 152 is removed to expose the support 124 for receipt of the high lift jack. The threaded shank emanating from the outer vertical segment 186 receives the knob 152 to secure the high lift jack. Each of the embodiments described herein may also include a locking member 190 to prevent removal of the knob.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims.

What is claimed is:

1. A bracket system adapted for interconnection to a vehicle rack, comprising:
   a bracket having a first portion, a second portion, and a third portion that define a triangular shape, said third portion being the longest side of said triangular shape;
   a hook interconnected to said first portion, said hook being adapted for interconnection to a top portion of the vehicle rack;
   a clamp plate selectively interconnected to said second portion, said clamp plate being adapted for interconnection to a bottom portion of the vehicle rack that is spaced from the top portion of the vehicle rack;
   wherein said clamp plate is interconnected to said second portion with a bolt and a nut, wherein said nut or bolt head is located within said triangular shape;
   a first support extending from said third portion;

a second support extending from at least one of said second portion and said third portion;

a threaded shank extending from said third portion;

a retainer plate operatively associated with said threaded shank, said retainer plate having a first position of use away from said first support and said second support, and a second position of use near said first support and near said second support, which defines a first storage envelope and a second storage envelope; and a knob threadingly engaged onto said threaded shank, wherein tightening said knob onto said shank moves said retainer plate from said first position of use to said second position of use.

2. The system of claim 1, wherein said retainer plate has curled ends.

3. The system of claim 1, further comprising a spring positioned about said threaded shank and positioned between said retainer plate and said third portion.

4. The system of claim 1, wherein said second support is L-shaped and interconnected to the intersection of said second portion and said third portion.

5. The system of claim 1, further comprising a lock associated with said knob.

6. A bracket system adapted for interconnection to a vehicle rack, comprising:

a bracket having a first portion, a second portion, and a third portion, wherein said first portion and said second portion are interconnected to form a first angle that is less than 180 degrees, wherein said second portion said third portion are interconnected to form a second angle that is less than 180 degrees, and wherein said third portion and said first portion are interconnected to form a third angle that is less than 180 degrees;

a hook interconnected to said first portion, said hook being adapted for interconnection to a top portion of the vehicle rack;

a clamp plate selectively interconnected to said second portion, said clamp plate being adapted for interconnection to a bottom portion of the vehicle rack that is spaced from the top portion of the vehicle rack;

wherein said clamp plate is interconnected to said second portion with a bolt and a nut, wherein said nut or bolt head is located within a volume at least partially defined by said first portion, said second portion, and said third portion;

a support extending from said third portion;

a member extending from said third portion;

a securing member selectively engaged onto said member, wherein said knob, said third portion, and said support define a storage volume.

7. The system of claim 6, further comprising a lock associated with said securing member.

8. The system of claim 6, further comprising a retainer operatively associated with said member and maintained on said member by said securing member, said retainer having a first position of use away from said support, and a second position of use near said support.

9. The system of claim 8, wherein said retainer has curled ends.

10. The system of claim 8, further comprising a spring positioned about said member and positioned between said retainer and said third portion.

\* \* \* \* \*